United States Patent
Belser et al.

(10) Patent No.: US 6,738,207 B1
(45) Date of Patent: May 18, 2004

(54) METHOD FOR SYNCHRONIZING THE WRITE CURRENT FOR MAGNETIC RECORDING WITH THE BIT ISLANDS ON DISCRETE BIT PATTERNED MEDIA

(75) Inventors: Karl A. Belser, San Jose, CA (US); Stephen J. Hrinya, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 293 days.

(21) Appl. No.: 09/641,213

(22) Filed: Aug. 18, 2000

Related U.S. Application Data

(60) Provisional application No. 60/149,598, filed on Aug. 18, 1999.

(51) Int. Cl.$^7$ ............................................... G11B 27/36
(52) U.S. Cl. ............................................ 360/31; 360/51
(58) Field of Search ......................... 360/55, 51, 49, 360/72.2, 73.03, 75, 31, 78.04, 78.14, 77.02, 77.08; 324/212, 210, 226

(56) References Cited

U.S. PATENT DOCUMENTS

| | | | | |
|---|---|---|---|---|
| 5,623,474 A | * | 4/1997 | Oshio et al. | 360/65 |
| 5,699,204 A | * | 12/1997 | Inbar | 360/31 |
| 6,064,541 A | * | 5/2000 | Sasamoto et al. | 360/77.08 |
| 6,643,082 B1 | * | 11/2003 | Belser | 360/48 |

* cited by examiner

Primary Examiner—Alan T. Faber

(57) ABSTRACT

A patterned recording media is comprised of a combination of raised features and depressed features in or on the surface of the recording disk. A depressed feature is known as a pit, while a raised feature is known as an island. The islands form areas where one or more data bits can be written. The recording head is synchronized to the discrete bit pattern by determining the correct clock cycle (phase) and clock count within the clock cycle.

30 Claims, 15 Drawing Sheets

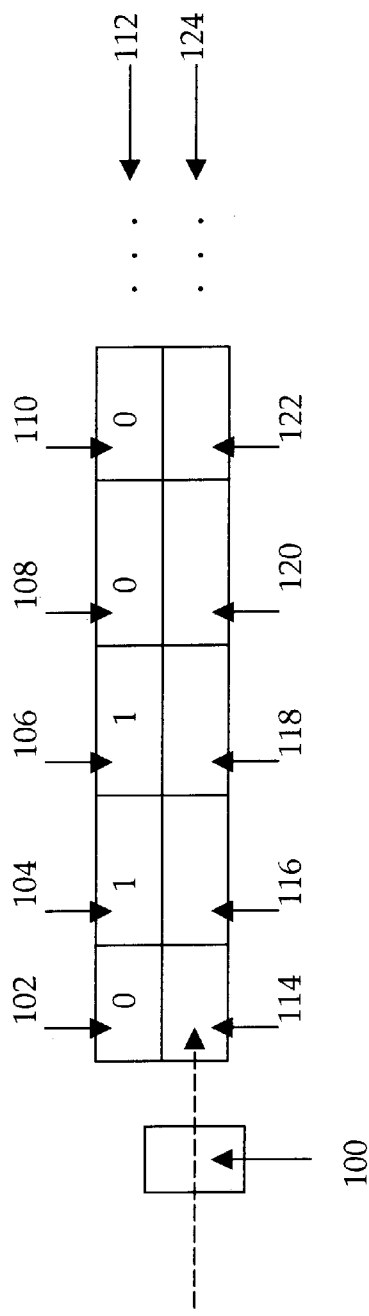
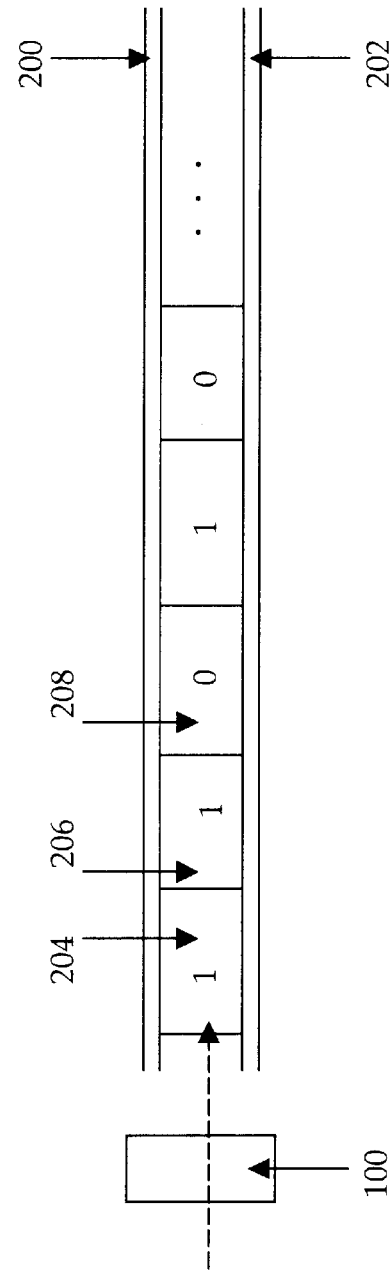
Figure 1 - Prior Art
Figure 2 - Prior Art

METHOD FOR SYNCHRONIZING THE WRITE CURRENT FOR MAGNETIC RECORDING WITH THE BIT ISLANDS ON DISCRETE BIT PATTERNED MEDIA

CROSS-REFERENCE TO RELATED APPLICATIONS

This application is related to and claims the benefit of commonly assigned United States Provisional Application No. 60/149,598, filed on Aug. 18, 1999 and entitled "Method For Synchronizing The Write Current For Magnetic Recording With The Bit Islands On Discrete Bit Patterned Media." The subject matter of this related application is incorporated herein by reference.

This application is related to U.S. patent application Ser. No. 09/591,180, entitled "Patterned Media Process", filed on Jun. 8, 2000. This application is also related to U.S. patent application Ser. No. 09/591,546, entitled "Servo Sector Format For A Patterned Media", filed on Jun. 8, 2000. The subject matter of these related applications are incorporated herein by reference. All related applications are commonly assigned.

BACKGROUND OF THE INVENTION

1. Field of the Invention

The present invention relates generally to magnetic recording media, and more particularly to a method for writing and/or reading magnetic bits onto a magnetic recording media. Still more particularly, the present invention relates to a method for synchronizing a recording head with the bit islands on discrete bit patterned media.

2. Description of the Prior Art

Designers, manufacturers, and users of computing systems require reliable and efficient digital information storage and retrieval equipment. Conventional storage systems, such as magnetic disk drives, are typically used and are well known in the art. As the amount of information that is stored digitally increases, however, users of magnetic recording media need to be able to store larger and larger amounts of data. To meet this demand, designers of magnetic recording media are working to increase the storage capacity of a recording disk, which is a function of the number of closely spaced concentric tracks on the surface of the disk. Designers are also working on techniques to write digital data more efficiently, thereby utilizing the storage capacity of a disk in a more effective manner.

FIG. 1 illustrates a prior art method for writing magnetic bits onto a magnetic media. A write head 100 writes a plurality of magnetic bits 102, 104, 106, 108, 110 along a track 112 as the write head 100 passes over the track. The plurality of magnetic bits 102, 104, 106, 108, 110 are written adjacent to each other, as well as adjacent to the plurality of magnetic bits 114, 116, 118, 120, 122 on track 124. Unfortunately; there are several limitations to this method. First, the width of the write head 100 can vary significantly from disk to disk. In fact, in some disk storage systems, the width of the write head can vary from the width of a track by a factor of 2 to 1.

The width of the write head 100 determines the width of the magnetic bits. A narrow write head may not completely erase the information previously written on the track (e.g. track 112). Similarly a wide write head may write unwanted information on an adjacent track (e.g. track 124). When data is read from the disk, interference between unwanted information and non-erased information can result in a poor signal to noise ratio.

Another problem is the fringe fields created by the write head 100. When the write head 100 is writing magnetic bits on track 124, for example, the fringe fields can erase the magnetic bits stored on adjacent track 112. Furthermore, the fringe fields can cause the written magnetic bits to have curved ends. Magnetic bits are best written with straight, radial edges because it makes it easier for the head to read the bits. Curved ends on the bits are undesirable because they make it more difficult to read the magnetic bits.

Adjacent magnetic bits can also destabilize each other on the same track, creating yet another limitation to this method. Magnetic bits are made up of a number of magnetic grains. Small grains are less stable than larger grains due to thermal agitation. This thermal instability is called the super paramagnetic effect and is exacerbated by the presence of the magnetic fields from adjacent bits. These fields can cause the grains at the edge of a bit to switch, resulting in interbit noise. This interbit noise is sometimes called zigzag noise for longitudinal recording due to the ragged way the transitions between bits form. In extreme cases, an entire bit can be switched causing a loss of data.

Another prior art method for writing magnetic bits is depicted, in FIG. 2. Grooves 200, 202 are formed in the surface of the disk and between the tracks. Grooves 200, 202 define the radial width of the magnetic bits, and the concern over the varying width of the write head 100 is eliminated. But the issue of destabilization survives. The bits in a track can destabilize adjacent bits along the track. For example, magnetic bit 204 can destabilize magnetic bit 206, and magnetic bit 206 can destabilize bits 204 or 208.

Therefore, what is needed is an improved method for writing stable magnetic bits in a magnetic media.

SUMMARY OF THE INVENTION

The present invention overcomes the limitations of the prior art by writing the data on discrete islands on the media. These islands may be magnetically dead regions between the tracks and between the bits or by depression in the media surface between the tracks and between the bits. The later depressions would be deep enough so that the write head could not magnetize the media in the depressions and the read head could not sense the magnetic fields from the depressions. The present invention provides a method for initially synchronizing a recording head with the bit islands on discrete bit patterned media.

The write head and/or read head is synchronized to the discrete bit pattern by determining the correct clock cycle (phase) and clock count within the clock cycle. The delay will slowly vary as a function of temperature, power supply voltage, disk velocity and vibration disturbances. The present invention also provides a method for continuously (or periodically) correcting the changes in effective delay between the clock and the features on the media to compensate for the system parameter variations.

In one embodiment of the invention, the clock from a phase locked oscillator (PLO) will be used as the write clock source. The PLO is locked onto the servo sectors, and starting delay value is selected. Using this starting delay value, at least one pattern is written on the disk. The at least one pattern is then read and the point at which at least one transition occurs is noted. Using at least one transition, a delay correction value is determined and the programmable delay adjusted so each bit in the pattern is written at a desired location on each island. The delay correction value should adjust the delay of the write head so that the pattern is written at appropriate locations on the islands and no transitions occur when the pattern is read.

In an alternative embodiment, the starting delay value is varied by small increments after every servo sector such that one full PLO clock cycle is divided into many parts. A one (1) followed by a zero (0) pattern is written repeated in the data wedges between servo sectors. The disk is then read and the clock phase at which the bit slips is noted. A delay correction value is then determined and the delay adjusted so that the write head writes magnetic bits at appropriate locations on the islands (blocks 812 and 814).

In another alternative embodiment, the read head is separated from the write head. A PLO field is read and the PLO is locked onto the media. The write head then writes in a sync field using a low voltage write current. This creates a coupling between the read and write heads. The MR element is then sensed, and a phase delay is determined. A phase error signal is determined by subtracting phase delay P from an initial phase delay Po. The phase error signal is used to adjust the programmable delay until Po-P equals zero.

The present invention also includes an exemplary method for locating an initial magnetic bit prior to writing magnetic bits onto the patterned media. In this embodiment, the initial bit is the first island in the data wedge immediately following a servo sector, although the method can be utilized to begin writing bits at any desired island. A pattern is written on the disk. In one embodiment, the pattern is comprised of a combination of ones (1) and zeros, one example being 00010111. With each successive pattern writing, the pattern itself is sequentially shifted left or right. For example, if the pattern 00010111 is written in the first sector, then the pattern 10001011 (or 00101110) is written in the second sector. In the third sector the pattern 11000101 (or 01011100) is written, and so on. In this embodiment, the pattern is read in order to determine where you get a transition in the first bit of a data wedge.

In another embodiment, the pattern is comprised of one or more zeros followed by one or more ones, such as 00000011. With each successive pattern writing, the pattern itself is sequentially shifted left or right. In this embodiment, the pattern is read in order to determine where you get a transition in the first bit (or desired bit) of a data wedge.

And in yet another embodiment, the pattern is comprised of a combination of ones and zeros that are decodable. For example, if the pattern 00010111 is written on the disk, then in each sector a portion of the pattern is decoded. For example, the pattern is grouped into 3 bits, beginning with 000. The binary number for this group is zero. In the next sector, moving one bit to the right, the portion of the pattern is 001. The binary number for this group is one. In the next sector the portion is 010 which is two. This continues around the disk. The desired bit location is determined by reading the pattern.

And finally, two exemplary methods for fabricating a patterned magnetic media are disclosed.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 1 illustrates a prior art method for writing magnetic bits onto a magnetic media;

FIG. 2 depicts a prior art method for writing magnetic bits onto a magnetic media;

FIG. 8(*b*) is a flowchart illustrating an alternative exemplary method for adjusting a programmable delay according to the present invention;

DETAILED DESCRIPTION

The present invention relates to synchronizing a recording head to a patterned media. The following description is presented to enable one of ordinary skill in the art to make and use the invention and is provided in the context of specific embodiments. However, various modifications to the specific embodiments will be readily apparent to those skilled in the art and the generic principles herein may be applied to other embodiments. Thus, the present invention is not intended to be limited to the embodiment shown but is to be accorded the widest scope consistent with the appended claims and with the principles and features described herein.

The present invention will now be described with reference to a patterned magnetic media. The present invention, however, is not limited to magnetic media. The present invention can be utilized with any patterned recording media.

Figure 3:
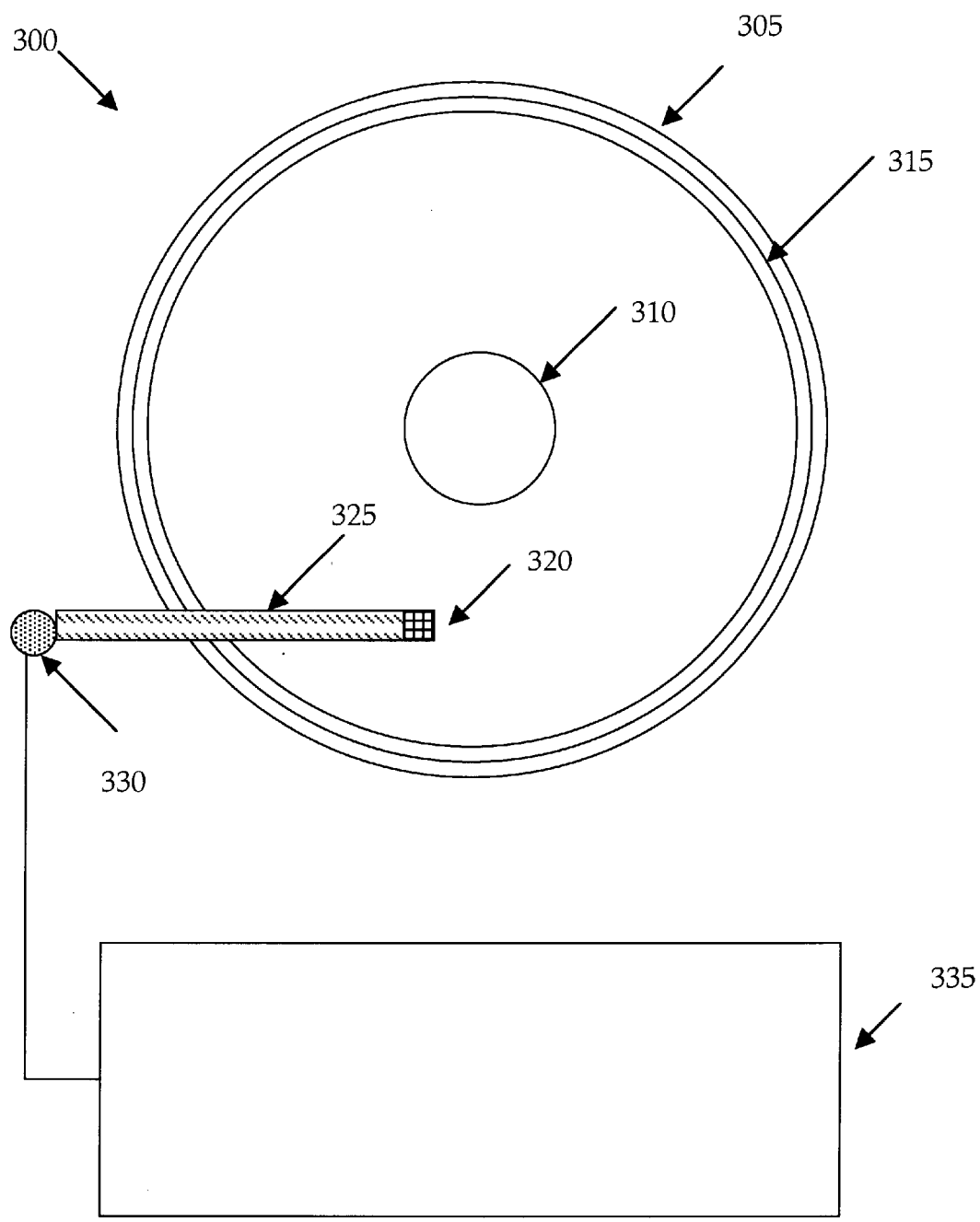
FIG. 3 is a diagram of a conventional hard disk drive assembly.

FIG. 3, illustrates a diagram of a conventional hard disk drive assembly. The disk drive assembly 300 includes one or more recording disks 305, which are rotated at high speeds by a spindle motor 310. A plurality of concentric tracks 315 are recorded on the surface of the disk 305 and are used to store data. For clarity, only two tracks are shown in FIG. 3. The tracks are displaced radially from each other, beginning at the inner diameter of a disk and continuing to the outer diameter.

A recording head 320 is used to read data from and write data to specific locations on the disk 305. The recording head 320 is an air-bearing head, meaning it moves, or "flies", at a very close distance from the surface of, the disk 305. The recording head 320 is attached to an arm 325, which in combination with an actuator 330 moves the recording head 320 from one track to another on the disk. Storage system controller 335 controls the placement of the recording head 320 to a specific logical location via a particular track address and a particular sector address.

Figure 4:
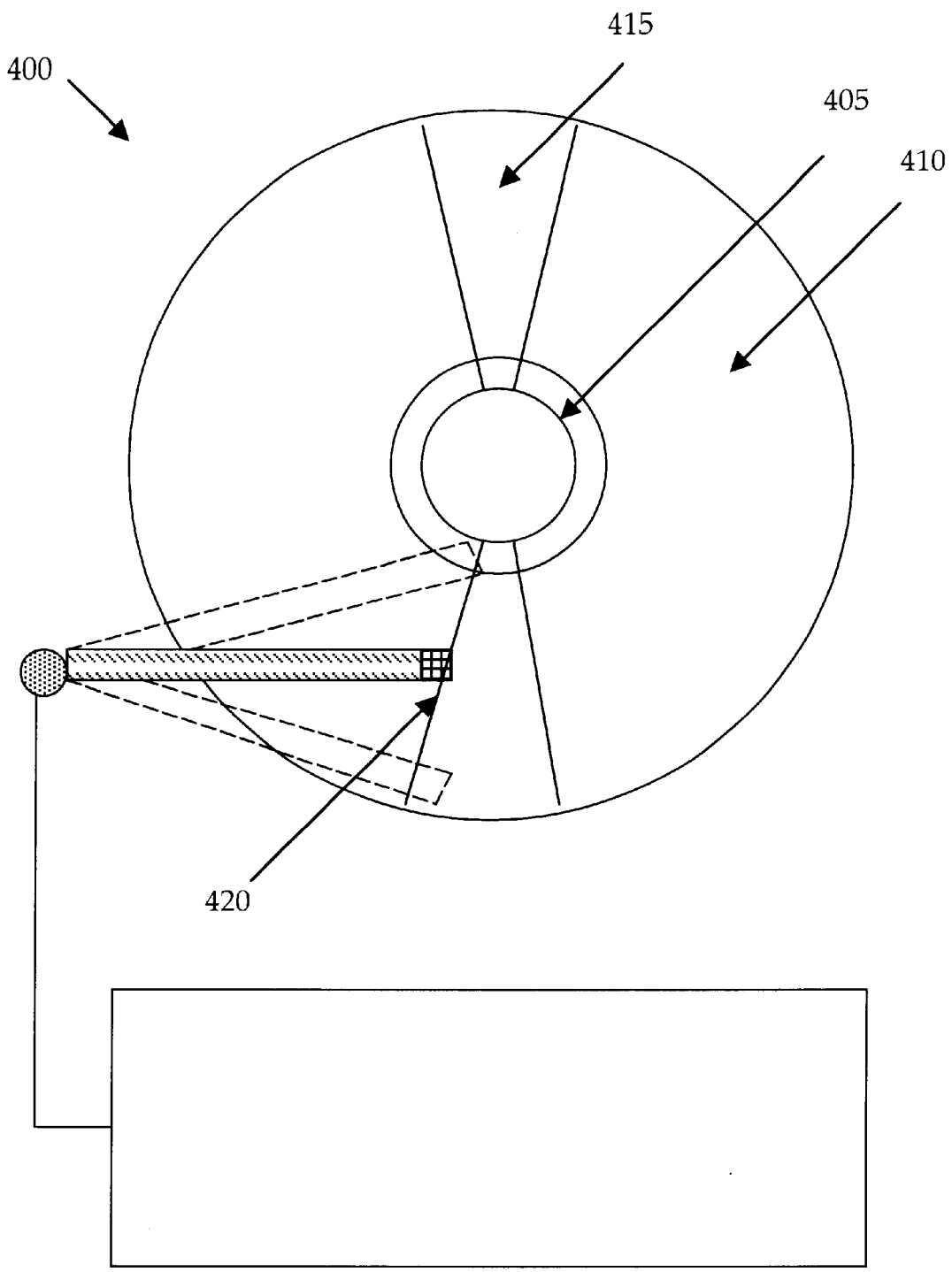
FIG. 4 is a diagram depicting an upper surface of an exemplary recording disk utilized in the disk drive assembly of FIG. 3.

FIG. 4 is a diagram depicting an upper surface of an exemplary recording disk used in the disk drive assembly of FIG. 3. The upper surface of recording disk 305 typically includes a landing zone 405, a useable data zone 410, arc-shaped sectors 415, and an arc-shaped path 420 taken across the recording disk 400 surface by read/write head 320. As discussed earlier, arm 325 turns around the actuator axis 330 to position the recording head 320 relative to the center of the spindle 310.

Figure 5:
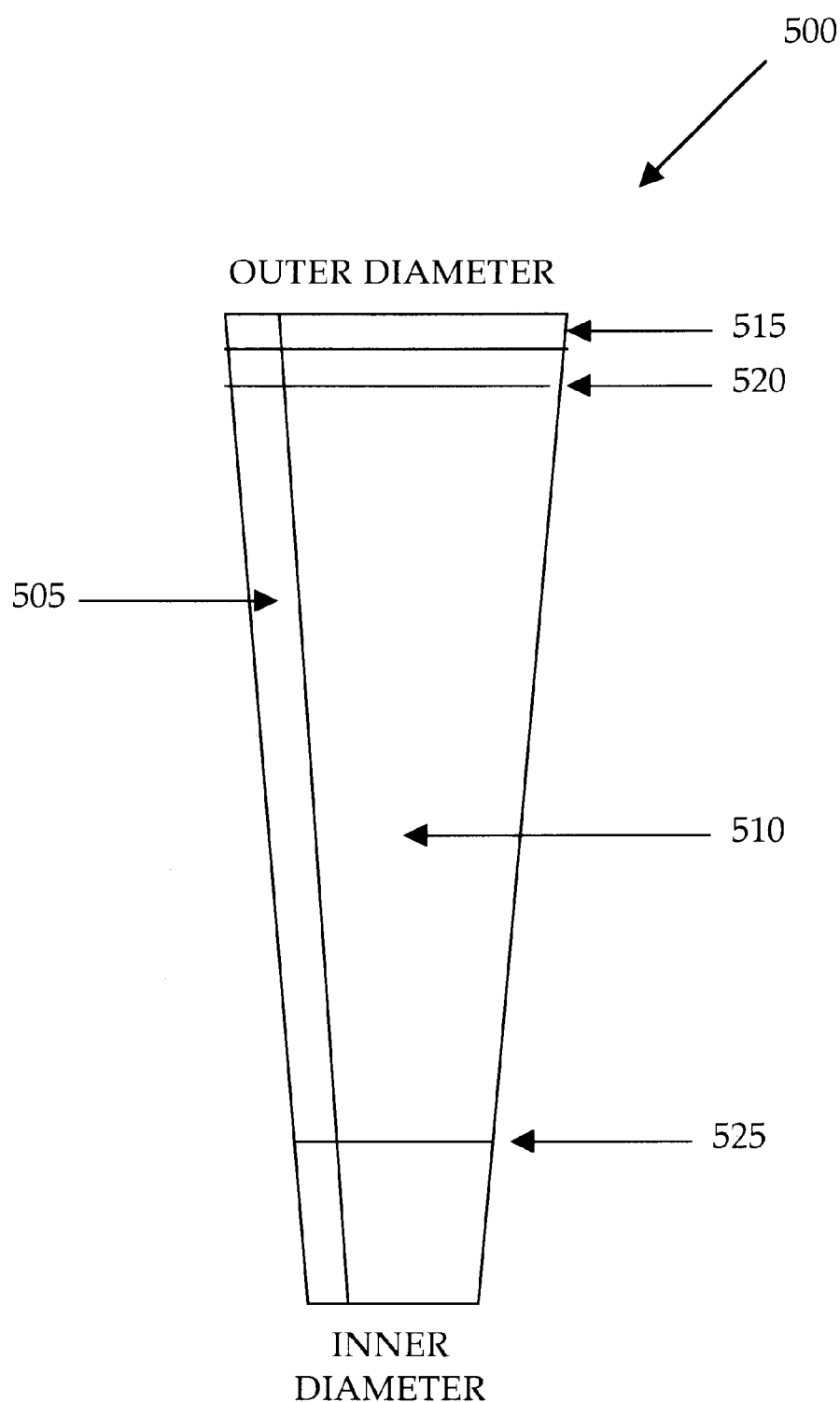
FIG. 5 is a linearized diagram of one embodiment of a sector of the exemplary recording disk illustrated in FIG. 4.

Referring now to FIG. 5, a linearized diagram of one embodiment of a sector illustrated in FIG. 4 is shown. Exemplary recording disk 305 typically includes an sector 500, a servo sector 505, a data wedge 510, a pair of neighboring numbered concentric tracks 515 and 520, and a border 525 between landing zone 405 and useable data zone 410. Data wedge 510 includes stored user data, while servo sector 505 includes address and alignment information used by the disk drive system.

Figure 6:
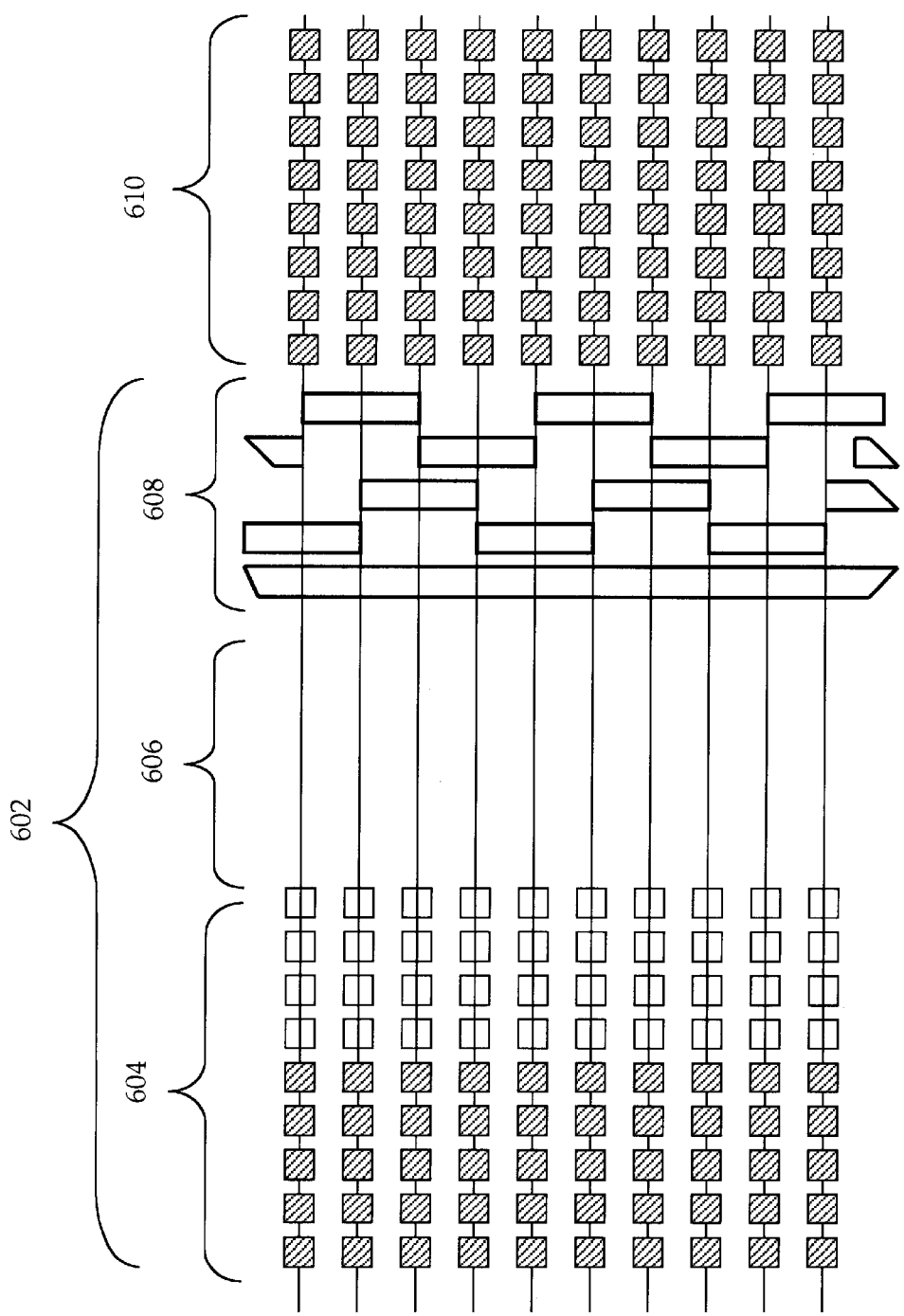
FIG. 6 illustrates an exemplary patterned magnetic media according to the present invention.

FIG. 6 illustrates an exemplary patterned magnetic media according to the present invention. Patterned magnetic media 600 is comprised of a combination of raised features and depressed features in or on the surface of the recording disk. A depressed feature is known as a pit, while a raised feature is known as an island. The islands form areas where one or more magnetic bits can be written. The horizontal lines shown in FIG. 6 depict the center of the concentric tracks on the disk.

The exemplary patterned magnetic media is comprised of a position error signal field (602), which is comprised of a phase-locked oscillator (PLO) and automatic gain control (AGC) field 604, a sync field 606, and a burst field 608. In this embodiment, PES field 602 forms a servo sector on the disk. Exemplary patterned magnetic media 600 is also comprised of a data field 610 where user data is stored.

In this embodiment the media is magnetized either out of the page or into the page to encode a zero (0) or one (1), respectively. This type of recording is known as vertical recording. Although this embodiment utilizes vertical recording, the present invention is not limited to that type of recording. The present invention can also be used with longitudinal recording, a type of recording where the magnetic bits are magnetized in the left or right direction along the plane of the page.

The sync field 606 is comprised of a unique run of one or more bit cells with no magnetization (blank area), while the burst field 608 is comprised of a sync character, an A burst, a B burst, a C burst, and a D burst. In this embodiment, a position error signal (PES) is determined by PES=(A-B)/(C-D) if PES<1 or 1/PES. Those skilled in the art, however, will appreciate that the position error signal can be determined using other calculations. At the track centers (the horizontal lines in this illustration) the PES equals zero.

When magnetic bits are to be written on the patterned media 600, the write current drive (not shown) and the readback amplifier (not shown) will have an unknown and variable delay depending upon the temperature and power supply voltage. In one embodiment of the present invention, the write current is synchronized so that the write current pulses are centered over the islands. A programmable delay line is utilized to synchronize the write current with the bit patterns on the magnetic media. The write current is synchronized to the bit pattern by determining the correct clock cycle (phase) and clock count within the clock cycle.

Figure 7:
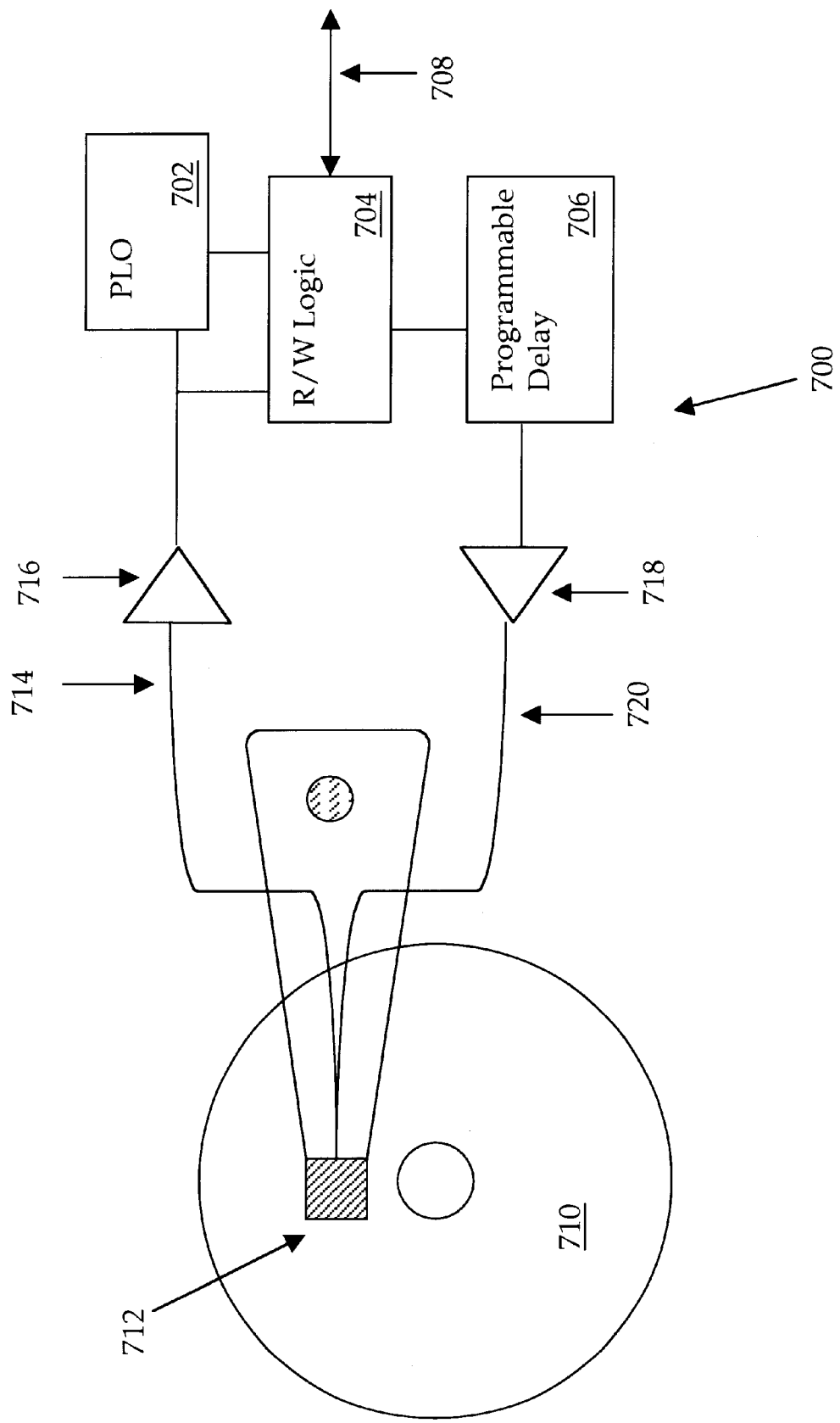
FIG. 7 is a block diagram of an exemplary read/write circuit according to the present invention.

Referring to FIG. 7, a block diagram of an exemplary read/write circuit according to the present invention is shown. The exemplary read/write (R/W) circuit 700 is comprised of a PLO 702, read/write logic 704, and a programmable delay 706. Data signals are input and output via line 708. A read/write head 710 reads magnetic bits from a disk 712 and sends the read data signal through PLO 702 and read/write logic 704 via line 714 and buffer 716. A write data signal is sent through programmable delay 706 and buffer 718 to read/write head 710 via line 720.

The PLO 702 is a phase locked oscillator and acts as a clock. Initially, as the write head moves above the disk, the PLO is not synchronized to the disk with respect to phase. PLO 702 is comprised of a phase detector (not shown) that generates positive or negative current pulses. These positive or negative current pulses are input into an integrator (not shown), which in this embodiment is a capacitor. To synchronize the phase of the write current with that of the media, the current pulses driving the integrator are gated causing the integrator to hold the frequency constant. The delay output on line 720 is adjusted to synchronize the phase of the write current with that of the media.

Figure 8A:
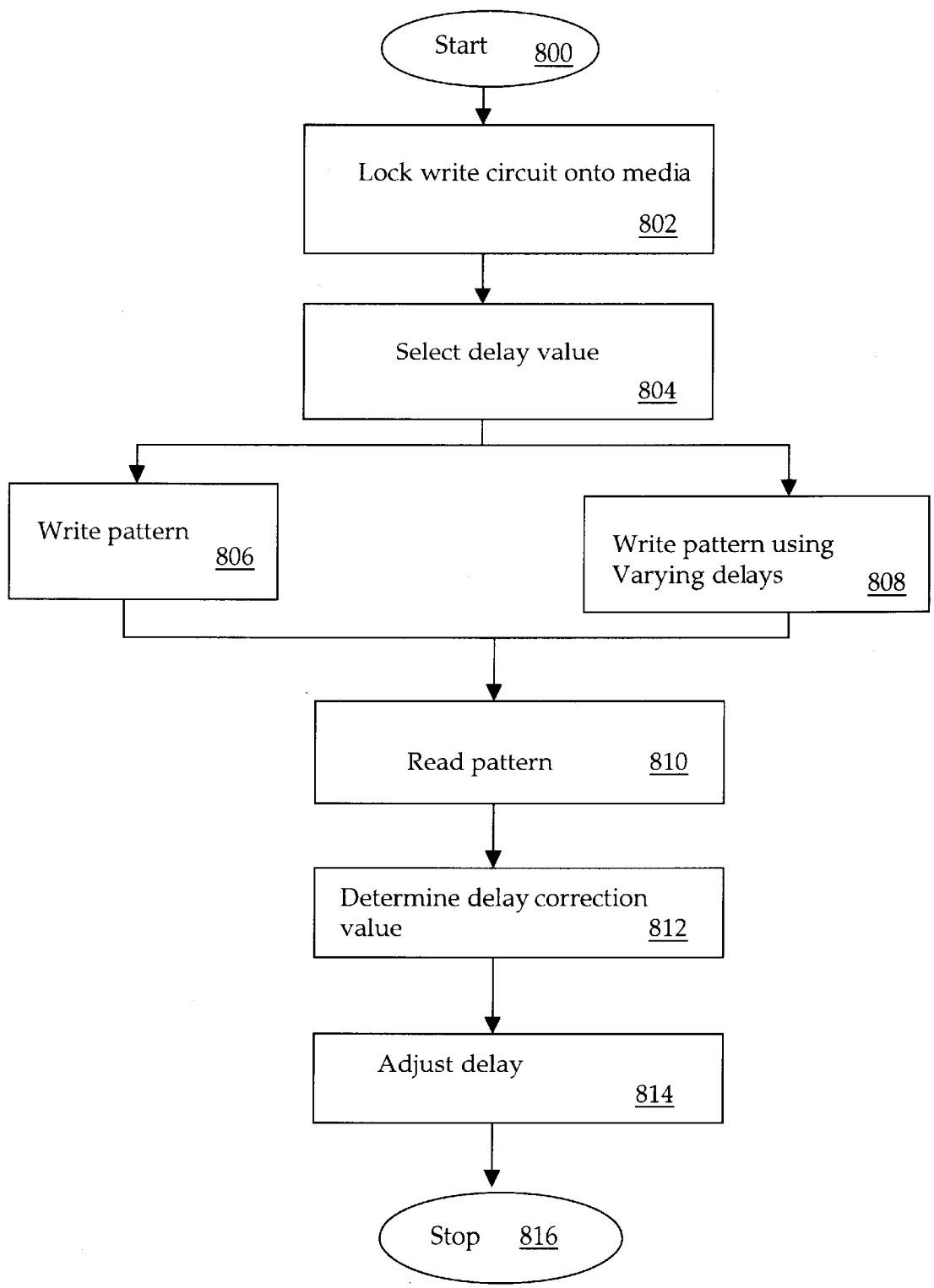
FIG. 8(*a*) is a flowchart depicting an exemplary method for adjusting a programmable delay according to the present invention.

FIG. 8(a) is a flowchart illustrating an exemplary method for adjusting a programmable delay according to the present invention. In this embodiment, the clock from the PLO will be used as the write clock source. The method begins at block 800 and thereafter passes to block 802, where the PLO is locked onto the servo sectors. At this point, the PLO has an unknown phase with respect to the disk. A delay value is then selected, as shown in block 804. Using this starting delay value, at least one pattern is written on the disk. The at least one pattern is then read and the point at which at least one transition occurs is noted. These actions are illustrated in blocks 806 and 810, respectively.

For example, the pattern 1010 is written on the disk. At some point, this pattern will be read as 0101 (or some partially incorrect pattern) and then at some point thereafter the pattern will be read as 1010 again. Using at least one of these transitions, a delay correction value (Po) is determined and the programmable delay adjusted so each bit in the pattern is written at a desired location on each island. These actions are illustrated in blocks 812 and 814, respectively. The delay correction value should adjust the delay of the write head so that the pattern is written at appropriate locations on the islands and no transitions occur when the pattern is read. The process then ends at block 816. This exemplary method can be repeated at periodically in order to maintain synchronization.

In an alternative embodiment the pattern is written using varying delay values, as shown in block 808. The starting delay value is varied by small increments after every servo sector such that one full PLO clock cycle is divided into many parts. A one (1) followed by a zero (0) pattern is written repeated in the data wedges between servo sectors. The disk is then read (block 810) and the clock phase at which the bit slips is noted. A delay correction value is then determined and the delay adjusted so that the write head writes magnetic bits at appropriate -locations on the islands (blocks 812 and 814). This alternative method completes the phase adjustment in just two revolutions of the disk. The pattern is written with varying delay values in one revolution and the pattern is read in a second revolution of the disk.

An example of the alternative method described in the preceding paragraph includes a disk having 512 servo sectors and a clock cycle divisible into 128 parts. When writing the pattern on the disk, the delay value is changed by one in each servo sector. This means that in one revolution of the disk, the pattern will be repeated four times (512 sectors divided by 128 equals 4). Next, the disk is read and the location(s) where a change occurs is noted. Based on the location(s) of the change(s), a delay correction value is determined. Thus, in two revolutions of the disk a delay correction value is determined and the phase of the write head is synchronized with the disk.

And in another alternative embodiment, the read head is synchronized to the islands in a servo sector so that the read head begins reading at the proper location.

Figure 8B:
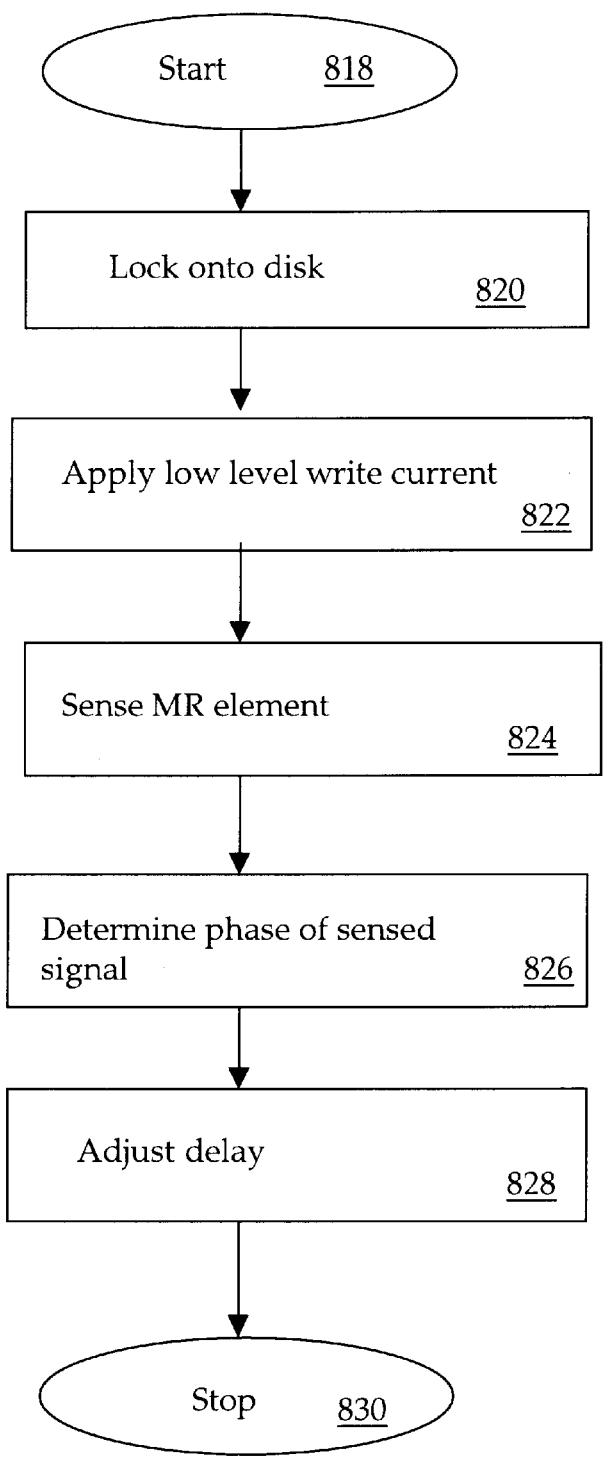

FIG. 8(*b*) is a flowchart illustrating an alternative exemplary method for adjusting a programmable delay according to the present invention. In this embodiment, the process described with reference to FIG. 8(*a*) is performed as a calibration procedure. The method depicted in FIG. 8(*b*) is utilized after a calibration procedure has been performed. This alternative method provides on every servo sector the ability to measure the delay and adjust it when the delay changes due to temperature or power supply voltage variations. The method can be performed on every servo sector (continuously) or on selected servo sectors (periodically).

In this embodiment, the recording head is an offset head. In other words, the read head is separated from the write head. Prior to performing the process illustrated in FIG. 8(*a*), the disk is DC erased in order to magnetize the media as a 1. To erase a disk, the read and write heads are loaded onto the disk surface at the outer diameter (OD) and then moved to the inner diameter (ID) to push against the ID crash stop. The crash stop is then compressed by about one hundred micrometers by applying a current to the actuator arm motor while applying sufficient DC current to DC magnetize the media and erase the media completely and uniformly.

The PLO field is read and the PLO is locked onto the media, as shown in block 820. The write head then writes in the sync field (field 606 in FIG. 6) using a low voltage write current. This creates a coupling between the read and write heads (block 822). Adequate writer to reader coupling will occur at a very low current. These low fields from the writer are typically not capable of writing on the media. In general, the writer may be positioned over user data or over the servo sector pattern.

The MR element is then sensed, as shown in block 824, and a phase of the sensed signal (P) is determined. Since the calibration procedure of FIG. 8(*a*) was performed prior to this, a delay correction value Po has been determined. A phase error signal is then determined by subtracting phase delay P from Po. The phase error signal is used to adjust the programmable delay until Po–P equals (or substantially equals) zero.

The alternative exemplary method of FIG. 8(*b*) stimulates the write head and the senses the data to measure directly the delays in the read channel and the write channel. The changes that occur in the read channel and/or the write channel are tracked and the programmable delay value(s) is adjusted to correct for any changes. This technique is used to continuously (or periodically) measure and correct any variations in delays.

Figure 9:
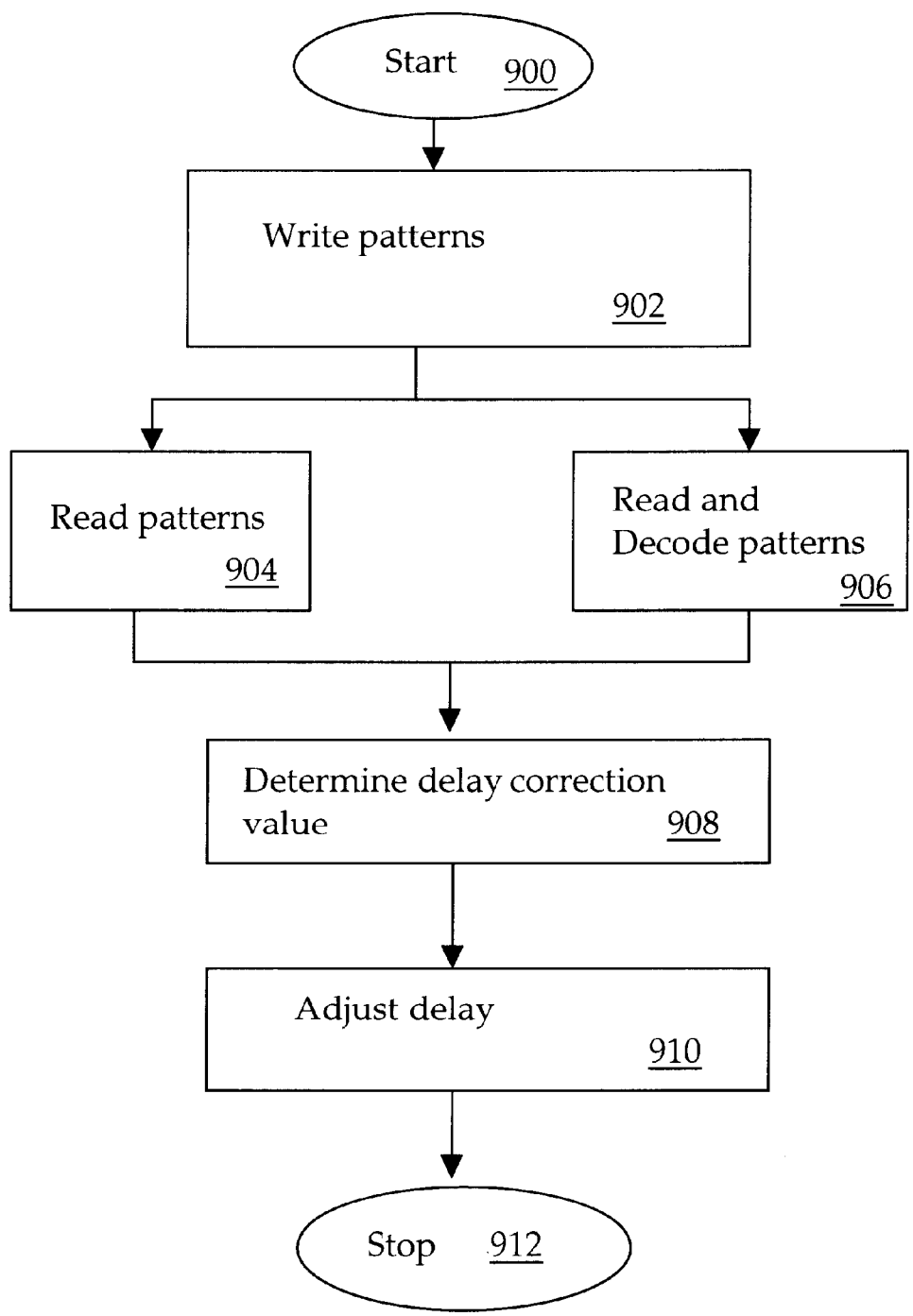
FIG. 9 is a flowchart depicting an exemplary method for locating an initial magnetic bit prior to writing magnetic bits onto a patterned media according to the present invention.

Referring to FIG. 9, a flowchart depicting an exemplary method, for locating an initial magnetic bit prior to writing magnetic bits onto a patterned media according to the present invention is shown. In this exemplary method, the initial bit is the first island in the data wedge immediately following a servo sector. However, the present invention is not limited to this initial bit location. The present invention can be implemented using any desired bit location as the initial bit location.

The process begins at block 900 and thereafter passes to block 902, where a pattern is written on the disk. In one embodiment, the pattern is comprised of a combination of ones (1) and zeros, one example being 00010111. With each successive pattern writing, the pattern itself is sequentially shifted left or right. For example, if the pattern 00010111 is written in the first sector, then the pattern 10001011 (or 00101110) is written in the second sector. In the third sector the pattern 11000101 (or 01011100) is written, and so on. In this embodiment, the pattern is read in order to determine where you get a transition in the first bit of a data wedge.

In another embodiment, the pattern is comprised of one or more zeros followed by one or more ones, such as 00000011. With each successive pattern writing, the pattern itself is sequentially shifted left or right. In this embodiment, the pattern is read in order to determine where you get a transition in the first bit of a data wedge.

And in yet another embodiment, the pattern is comprised of a combination of ones and zeros that are decodable. For example, if the pattern 00010111 is written on the disk, then in each sector a portion of the pattern is decoded. For example, the pattern is grouped into 3 bits, beginning with 000. The binary number for this group is zero. In the next sector, moving one bit to the right, the portion of the pattern is 001. The binary number for this group is one. In the next sector the portion is 010 which is two. This continues around the disk. The desired bit location is determined by reading the pattern.

And in another alternative embodiment, the read head is synchronized to the islands in a servo sector so that the read head begins reading at the proper location.

Figure 10A:
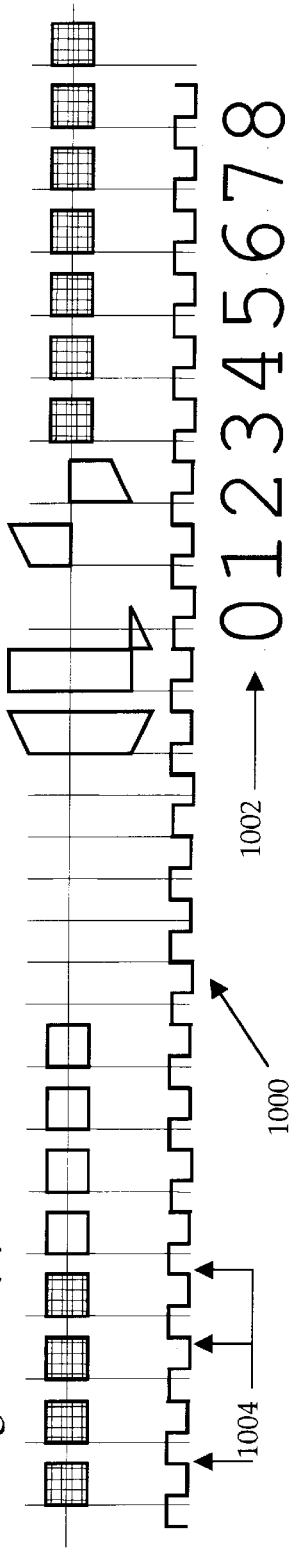
FIGS. 10(*a*)–10(*c*) are conceptual timing diagrams illustrating a method for synchronizing a write current to a patterned magnetic media according to the present invention.
Figure 10B:
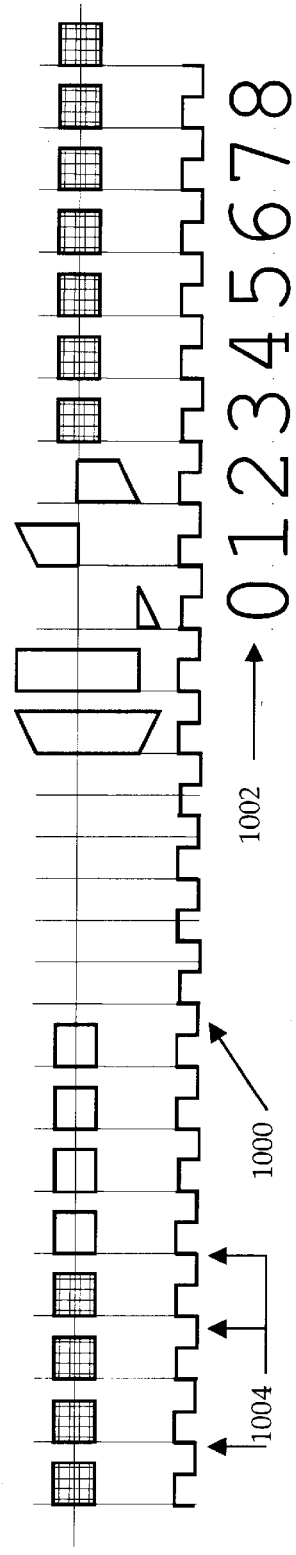
Figure 10C:
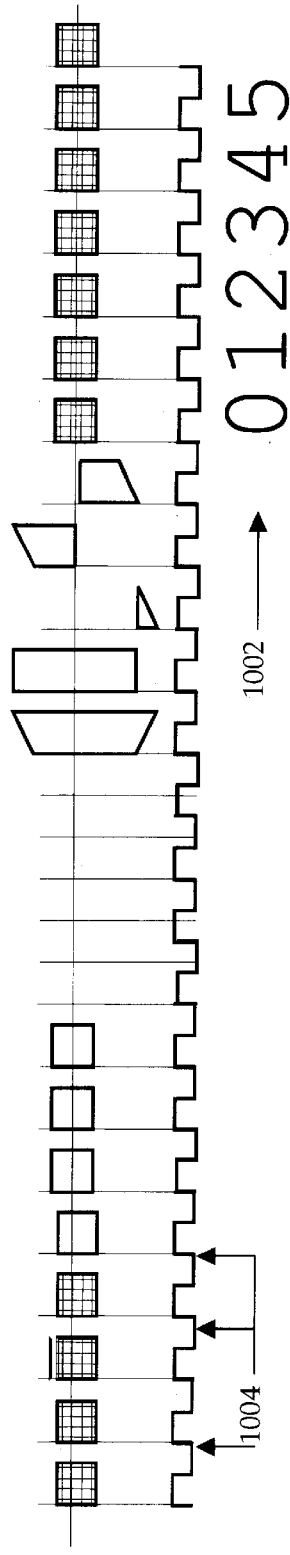

FIGS. 10(*a*)–10(*c*) are conceptual timing diagrams illustrating a method for synchronizing a write current to a patterned magnetic media according to the present invention. FIG. 10(*a*) depicts an unsynchronized clock signal 1000 where the clock phase and clock counter of a recording head are not synchronized with the media. The clock counter 1002 (numbers 0–8) does not coincide with the bit islands to be magnetized. Furthermore, the transitions 1004 when the write head is turned on are not synchronized with the bit islands. In this illustration, the transitions when the write current is turned on correspond to the positive transition of the clock signal and the leftmost side of an island. Those skilled in the art will appreciate, however, that the present invention is not limited to this embodiment. The transitions can occur at other positions on a clock signal (such as on the downward transition) and/or at other locations on the patterned media, examples being the center of a bit island or the pit just prior to each bit island.

FIG. 10(*b*) depicts the phase of the clock signal synchronized to the media. The transitions 1004 of the signal now correspond to the leftmost side of the bit islands. However, the clock counter 1002 (numbers 0–8) is not synchronized with the media. In this illustration, the first island after a servo sector corresponds to clock count 3 instead of 0. As discussed earlier, the first bit after the servo sector is the initial bit location. As such, the clock count for the first bit after the servo sector should correspond to 0.

The clock counter is then synchronized to the media, as shown in FIG. 10(*c*). Now the first bit island to be magnetized (the initial bit location) in this example corresponds to count 0. Those skilled in the art will recognize, however, that the first bit island to be magnetized is not limited to the one shown in FIG. 10(*c*). Any bit island on the disk can serve as the first bit to be magnetized. Additionally, the first bit island to be magnetized does not have to correspond to clock count 0. Any desired clock count can be utilized with the present invention.

Figure 11:
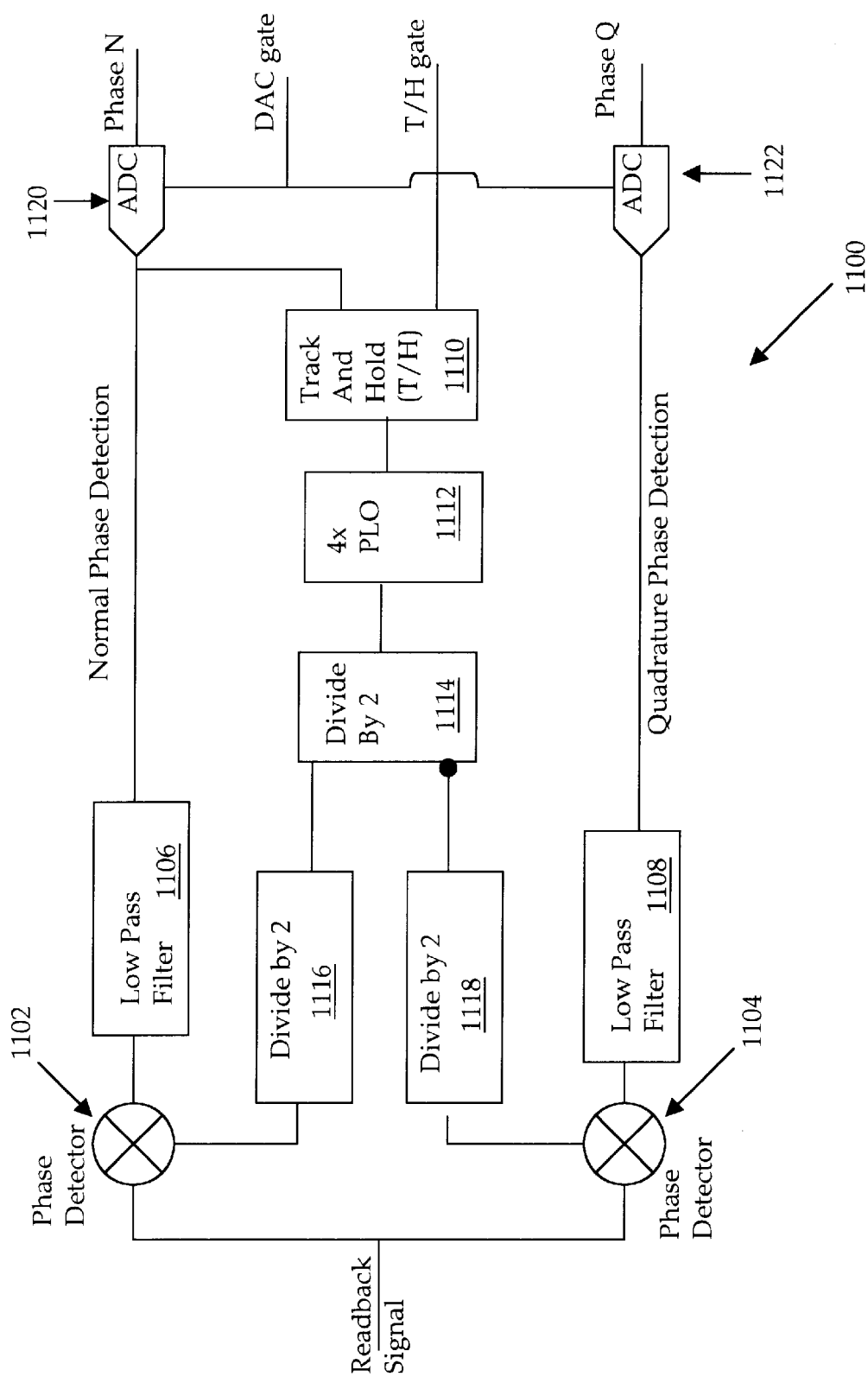
FIG. 11 is an exemplary block diagram of a phase detector circuit according to the present invention.

FIG. 11 is an exemplary block diagram of a phase detector circuit according to the present invention. The phase detector circuit 1100 is comprised of low phase detectors 1102, 1104, low pass filters 1106, 1108, a track and hold circuit 1110, a 4×PLO 1112 a first divide by 2 circuit 1114, a second divide by two circuit 1116, and a third divide by two circuit 1118. Second and third divide by 2 circuits 1116, 1118 generate the normal (N) and quadrature (Q) clocks. ADC gates 1120, 1122 sample the N and Q phase signals, which in this embodiment are comprised of sine-like and cosine-like waves, respectively. The normal and quadrature phase signals are functions of a delay relative to the PLO output.

To lock the PLO onto the media, the readback signal is sent through phase detector 1102, low pass filter 1106, and track and hold circuit 1110. This signal is then input into the PLO, and the T/H circuit 1110 activates after every PLO field in each servo sector so the PLO is able to track the PLO fields.

After the procedure disclosed with reference to FIG. 8(a) is performed, the N and Q values are measured and used as a set point for the delay error signal feedback to the programmable delay. In this embodiment, the phase detector circuit 1100 is able to detect a continuous range of phases (360 degrees). Since thermal and voltage variations typically occur slowly the delay value can be incremented (or decremented) after each measurement. The present invention, however, is not limited to this technique. The delay value can be adjusted at any point. Additionally, the delay setting may have a relatively large tolerance for error, so a plus or minus one (1) delay count can be acceptable when the clock period is divided into as few as eight parts.

One alternative phase detector circuit utilizes a 2×PLO at block 1112. An inverter is added to the signal path to divide by 2 block 1118. The output of the 2×PLO is sent to divide by 2 circuit 1116 and divide by 2 circuit 1118 via the inverter.

Figure 12A:
FIGS. 12(*a*)–12(*g*) are diagrams illustrating an exemplary method for fabricating a patterned magnetic media according to the present invention.
Figure 12B:
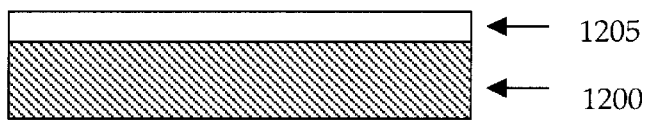
Figure 12C:
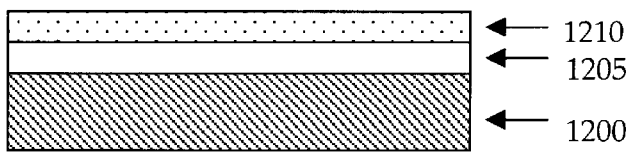

Patterning a magnetic media can be accomplished using several techniques. Two exemplary embodiments will now be described. Referring to FIGS. 12(a)–12(g), diagrams illustrating an exemplary method for fabricating a patterned magnetic media according to the present invention are shown. FIG. 12(a) depicts a substrate 1200, which can be comprised of a glass ceramic substrate, an aluminum substrate, or an aluminum substrate with a nickel phosphorus coating. An underlayer 1205 is then deposited onto the substrate (FIG. 12(b)), followed by a recording layer 1210 (FIG. 12(c)). Recording layer 1210 typically has a thickness of approximately ten to twenty nanometers. In this exemplary embodiment, the underlayer 1205 is comprised of a chromium layer 1205, and the recording layer 1210 is comprised of a cobalt chromium layer. Those skilled in the art will appreciate, however, that other materials can be used for the underlayer and the recording layer. For example, the underlayer 1205 may be comprised of a nickel phosphorus layer overlying an aluminum substrate.

Furthermore, the underlayer 1205 may actually be comprised of two or more layers. The material or materials that comprise the underlayer are determined by their properties. The underlayer (or layers) is typically grown on the surface of the substrate in order to promote the proper crystal orientation and enhance magnetic performance. Additionally, the underlayer 1205 and the recording layer 1210 may be doped with other elements in order to improve the recording performance. By way of example, platinum and boron may be added to a cobalt chromium layer.

Figure 12D:
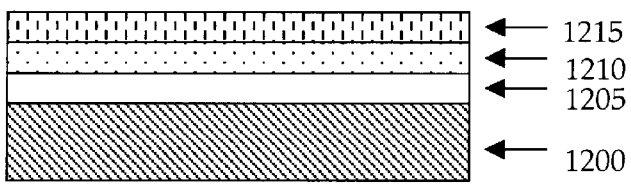
Figure 12E:
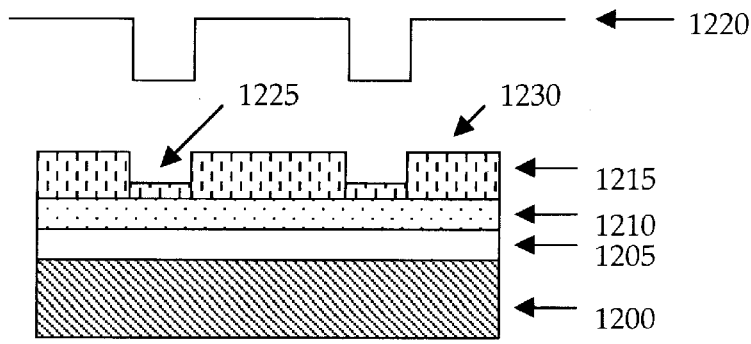
Figure 12F:
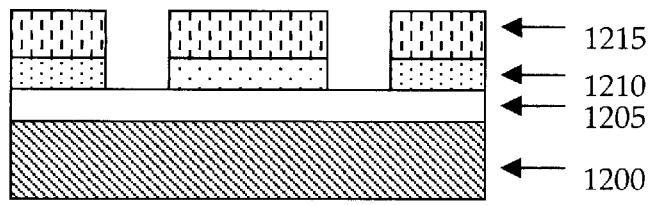
Figure 12G:
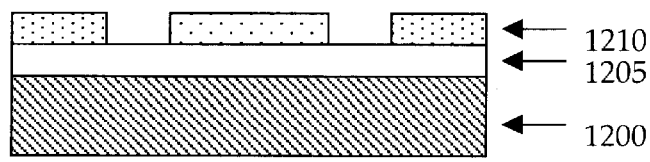

FIG. 12(d) illustrates the media with a deposited resist layer 1215 overlying the recording layer 1210. A stamper 1220 is then pressed into the resist layer 1215 in order to transfer a format pattern from the surface of the stamper into the surface of the resist layer 1215. FIG. 12(e) shows how portions of the resist layer 1225 are compressed, and other portions 1230 retain their original thickness after the stamper 1220 is removed. The compressed portions of the resist layer 1225 are then etched away, until the underlying recording layer 1210 is exposed. The etching process continues until portions of the recording layer 1210 are removed, thereby creating regions that can not be magnetized. Typically a vacuum reactive-ion etch is used, but a wet chemical etch can be used as well. This step is shown in FIG. 12(f). Now the remaining resist layer 1215 is removed, and a patterned magnetic media has been created (FIG. 12(g)).

As discussed above, the present invention utilizes a stamper 1220, and the technique for making a stamper will now be described. A stamper 1220 is comprised of a metal layer, such as nickel, and it is created from a master disk. A master disk is a recording disk that is manufactured using very specialized machinery in order to obtain precise positional and geometric features. A master is usually made by taking a polished glass disk and spin-coating a thin layer of photoresist material over a surface of the glass disk. The photoresist material typically used is Novolak with DNQ active components.

The photoresist material is then exposed to a pulsating electron or ion beam, where the pulsing of the beam is determined by the desired format pattern that is to be patterned into a magnetic media. A programmable formatter provides the necessary signal to modulate the recording laser beam with the desired format pattern. In the present invention, the format patterns can vary from one disk drive model to another, so the formatter is programmable in order to output the desired modulated signals for a specific format pattern.

The laser beam output by the formatter has the ability to define very small features, such as one hundred nanometers in size or smaller. Having the ability to define small or very dense format patterns means these small format patterns will be transferred to the stamper, which in turn means the small format pattern will be transferred to the patterned magnetic media. Thus, the patterned magnetic media is able to store more data than conventional magnetic recording disks.

Once the photoresist layer has been selectively exposed, the exposed areas are removed by washing them away with a developing solution. The remaining portions of the photoresist layer define the desired format pattern. A first stamper is then made from the master disk by, sputtering or evaporating a metal layer directly onto the photoresist layer. Since the deposition rate is relatively slow, only a thin layer of metal is coated over the photoresist layer in a reasonable time. Therefore, in order to make the first stamper more robust, an electroplating process is used to form a thicker layer of metal on the first stamper. Nickel is typically the metal used in the electroplating process, and the first stamper usually reaches a thickness of 0.3 millimeters.

The first stamper is then peeled away from the photoresist layer and is commonly used to create copies. A copy of the first stamper is created by first passivating the first stamper by providing a monolayer of oxide on the surface of the metal stamper. Passivation can be accomplished chemically by dipping the first stamper into an oxidizing solution, or electrochemically by making the first stamper an anode in an electrical circuit. After a thin layer of oxide forms on the surface of the first stamper, another electroplating process is performed and a layer of metal forms over the oxide layer. The layer of metal is then peeled away from the first stamper, whereby the layer of metal forms a copy of the first stamper. This copy, however, has a reverse image of the format pattern on its surface. So the copy is passivated and an electroplating process is performed in order to fabricate a second copy. Now, the second copy has the same format pattern as the first stamper, and the second copy is then used to make multiple copies of the patterned magnetic media.

The process described above is known in the art as a "family making process." The first stamper is known as the "father", and the copy of the first stamper is known as the "mother". The mother contains the reverse image of the format pattern. The second copy is known as the "son." The mother can be recycled may times in order to create a plurality of sons. Furthermore, the sons can be used multiple times, making them the perfect tool for a mass manufacturing process. Thus, the present invention provides a method for the mass production of patterned magnetic media.

Figure 13:
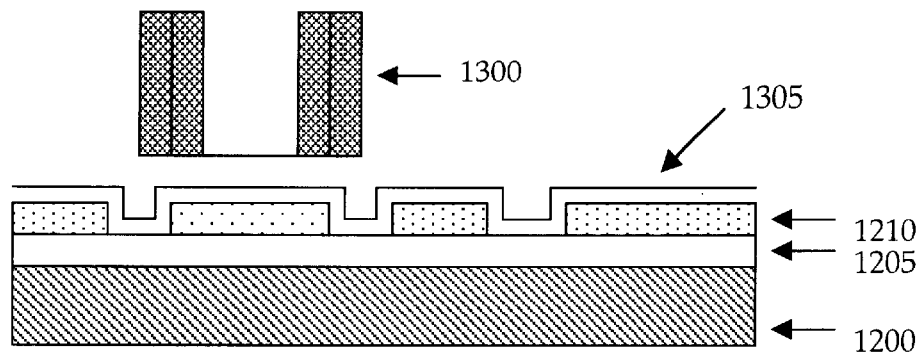
FIG. 13 is a diagram depicting a recording head flying over a patterned magnetic media that has been fabricated by the method shown in FIGS. 12(*a*)–12(*g*)

FIG. 13 is a diagram depicting a recording head flying over a patterned magnetic media that has been fabricated by the method shown in FIGS. 12(a)–12(g). Recording head 1300 flies over the patterned magnetic media and reads data from, or writes data to, the recording media by magnetizing the remaining recording layer 1210. In order to protect the recording layer and inhibit corrosion, a protective layer 1305 is typically deposited over the patterned magnetic media. One example of a protective layer 1305 is a carbon layer. If the protective layer 1305 was deposited prior to the etching process, the protective layer 1305 can be re-deposited after etching in order to ensure adequate coverage over the recording layer 1210. A lubricant layer (not shown) may also be deposited over protective the layer 1305. A perfluoropolyether organic polymer is example of a material that can be used as the lubricant layer.

Figure 14A:
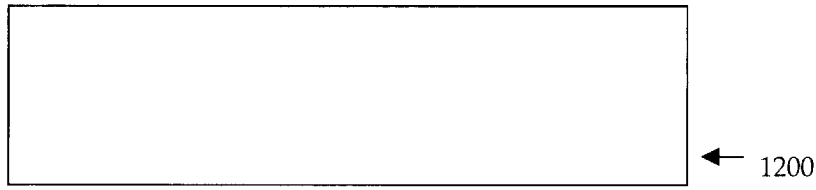
FIGS. 14(*a*)–14(*f*) are diagrams illustrating an alternative exemplary method for fabricating a patterned magnetic media according to the present invention.
Figure 14B:
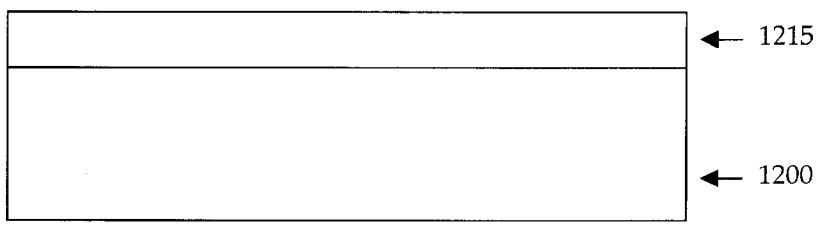
Figure 14C:
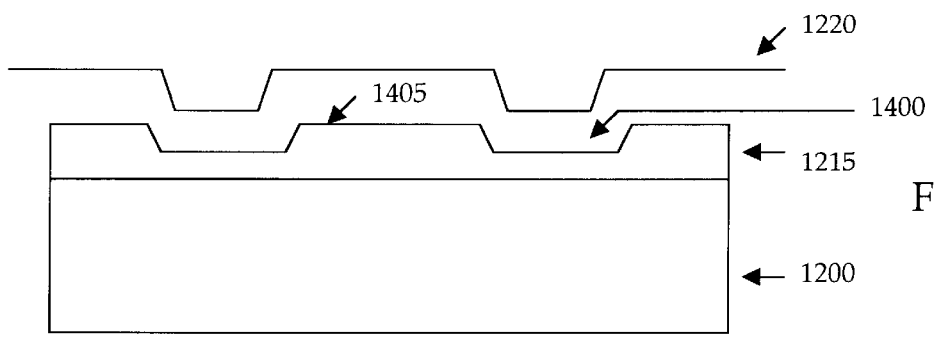
Figure 14D:
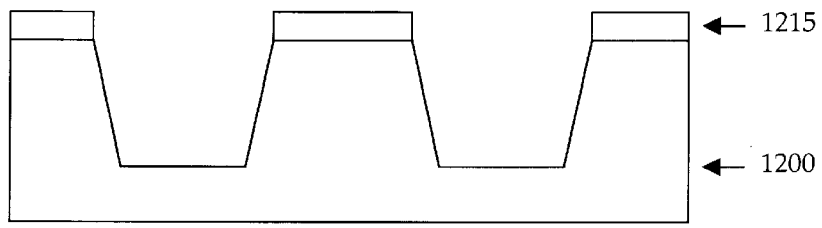

Referring to FIGS. 14(a)–14(f), diagrams illustrating an alternative exemplary method for fabricating a patterned magnetic media according to the present invention are shown. A resist layer 1215 is deposited over a substrate 1200. This step is shown in FIG. 14(b). A stamper 1220 is then pressed into the surface of the resist layer 1215 in order to transfer a format pattern from the surface of the stamper into the surface of the resist layer 1215. When the stamper 1220 is removed, portions of the resist layer are compressed 1400 and portions of the resist layer are not compressed 1405, as shown in FIG. 14(c).

The resist layer 1215 is then etched until the compressed portions of the resist layer 1405 are etched away and the underlying substrate 1200 is exposed. The etching process continues and portions of the substrate 1200 are removed until a desired etch depth is reached (FIG. 14(d)). It is important to make sure there is sufficient amount of resist on the surface of the substrate 1200, so that only the portions of the substrate 1200 that should be etched are etched. The desired etch depth is determined by the characteristics of the reading and writing system. In this exemplary embodiment, an etch depth of fifteen to twenty-five nanometers is typically used.

Figure 14E:
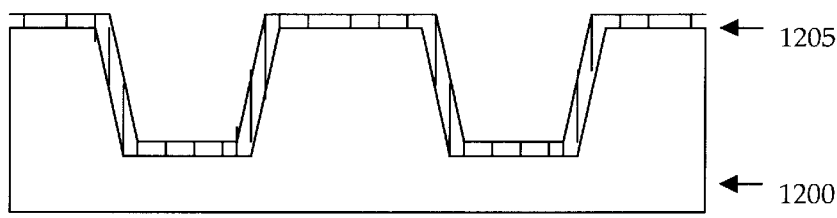
Figure 14F:
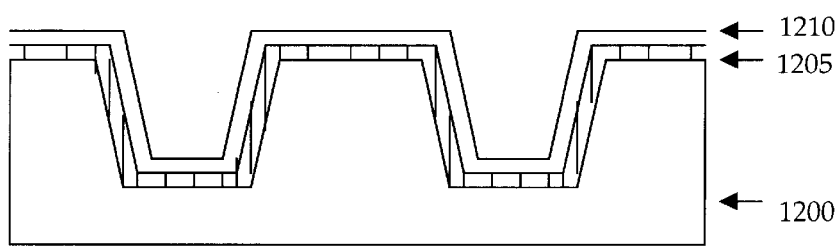

The resist layer 1215 is then removed, and an underlayer 1205 is deposited over the etched substrate 1200. A recording layer 1210 is deposited over the underlayer 1205. Both the underlayer 1205 and the recording layer 1215 conform to the etched surface of the substrate 1200. These steps are shown in FIGS. 14(e) and 14(f).

Figure 15:
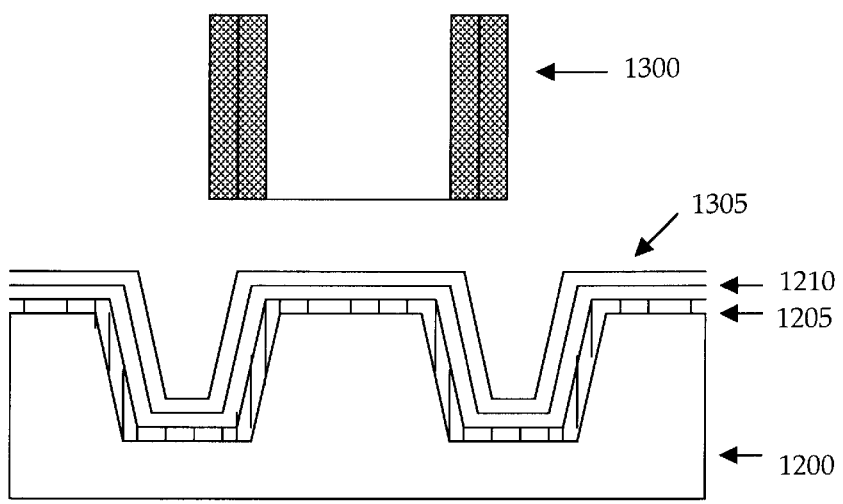
FIG. 15 is a diagram depicting a recording head flying over a patterned magnetic media that has been fabricated by the method shown in FIGS. 14(*a*)–14(*f*).

FIG. 15 is a diagram depicting a recording head flying over a patterned magnetic media that has been fabricated by the method shown in FIGS. 14(a)–14(f). Recording head 1300 flies over the patterned magnetic media and reads data from, or writes data to, the patterned magnetic media, by selectively magnetizing the recording layer 1210. The height difference between the etch areas and non-etched areas is used to selectively magnetize the upper and lower portions of the recording layer 1210 in different orientations. This creates a transition, which is detected as part of the servo signal. A protective layer 1305, along with a lubricant layer may also be deposited over the recording layer 1210.

While the invention has been particularly shown and described with reference to an exemplary embodiment, it will be understood by those skilled in the art that various changes in form and detail may be made therein without departing from the spirit and scope of the invention.

What is claimed is:

1. A method for synchronizing a recording head to a patterned magnetic media, the method comprising:
   determining a phase correction value and adjusting the phase of the recording head wherein this step is performed as a calibration procedure to determine an initial phase correction value Po; and
   determining the location of an initial bit island where a first data bit is to be processed by the recording head.

2. The method of claim 1, wherein the act of determining a phase correction value and adjusting the phase of a recording head comprises:
   selecting at least one starting delay value;
   writing at least one pattern on the patterned magnetic media;
   reading the at least one pattern; and
   determining a phase correction value and adjusting the delay of the recording head so that the phase of the recording head is synchronized with the phase of the patterned magnetic media.

3. The method of claim 2, wherein the act of writing at least one pattern on the patterned magnetic media comprises the act of writing a particular pattern on the patterned magnetic media.

4. The method of claim 2, wherein the act of writing at least one pattern on the patterned magnetic media comprises the act of writing a particular pattern on the patterned magnetic media using at least two different delay values.

5. The method of claim 4, wherein the act of writing at least one pattern on the patterned magnetic media using at least two different delay values comprises the act of writing a particular pattern on the patterned magnetic media with a plurality of delay values that correspond to a plurality of increments of one full clock cycle.

6. The method of claim 1, further comprising:
   measuring a phase value (P) on at least one servo sector; and
   adjusting the delay value of the recording head so that (Po-P) is approximately equal to zero.

7. The method of claim 6, wherein the act of measuring a phase value (P) on at least one servo sector comprises:
   writing data on a servo sector; and
   and reading the data to measure directly a delay in the read channel and a delay in the write channel.

8. The method of claim 1, wherein the act of determining the location of an initial bit island where a first data bit is to be processed by the recording head comprises:
   writing at least one pattern on the patterned magnetic media;
   reading the at least one pattern; and
   determining the location of the initial bit island based upon the resulting written at least one pattern.

9. The method of claim 8, wherein the act of writing at least one pattern on the patterned magnetic media comprises writing a particular pattern on the patterned magnetic media.

10. The method of claim 8, wherein the act of writing at least one pattern on the patterned magnetic media comprises writing a pattern comprised of a combination of ones and zeros, wherein with each successive written pattern the at least one pattern is sequentially shifted in a particular direction.

11. The method of claim 8, wherein the act of writing at least one pattern on the patterned magnetic media comprises writing at least one decodable pattern on the patterned magnetic media.

12. The method for synchronizing a phase of a recording head with a patterned recording media, the method comprising:
   selecting at least one starting delay value;
   writing at least one pattern on the patterned recording media wherein the act of writing at least one pattern on the patterned recording media uses at least two different delay values;
   reading the at least one pattern; and
   determining a phase correction value and adjusting the phase of the recording head so that the phase of the recording head is synchronized with the phase of the patterned recording media.

13. The method of claim 12, wherein the act of writing at least one pattern on the patterned recording media using at least two different delay values comprises the act of writing a particular pattern on the patterned recording media with a plurality of delay values that correspond to a plurality of increments of one full dock cycle.

14. A method for determining allocation of an initial bit island where a first data bit on a patterned recording media is to be processed by a recording head, comprising:
   writing at least one pattern on the patterned recording media, further comprising writing the at least one pattern as a combination of ones and zeros, wherein with each successive written pattern the at least one pattern is sequentially shifted in a particular direction;
   reading the at least one pattern; and
   determining the location of the initial bit island based upon the resulting written at least one pattern.

15. A phase detector circuit that synchronizes a recording head to a patterned recording media, comprising:
   at least one phase detector;
   at least one filter coupled to the output of the at least one phase detector;
   at least one track and hold circuit coupled to the output of the at least one filter;
   at least one clock circuit coupled to the output of the at least one track and hold circuit; and
   at least two divider circuits coupled to the output of the at least one clock circuit.

16. The phase detector circuit of claim 15, wherein the at least one filter is comprised of a low pass filter.

17. The phase detector circuit of claim 16, wherein the at least one clock circuit is comprised of a phase locked oscillator.

18. The phase detector circuit of claim 17, wherein the phase locked oscillator is comprised of a 4x phase locked oscillator.

19. The phase detector circuit of claim 18, wherein the at least two divider circuits is comprised of a first divide by two circuit coupled to an output of the 4x phase locked oscillator, a second divide by two circuit coupled to a positive output of the first divide by two circuit and a third divide by two circuit coupled to a negative output of the first divide by two circuit.

20. The phase detector circuit of claim 17, wherein the phase locked oscillator is comprised of a 2x phase locked oscillator.

21. The phase detector of claim 20, wherein the at least two divider circuits are comprised of a first divide by two circuit coupled to the output of the 2x phase locked oscillator and a second divide by two circuits coupled to the output of the inverter.

22. The phase detector circuit of claim 20, further comprising an inverter coupled to the output of the 2x phase locked oscillator.

23. A method for synchronizing the phase of a recording head to a patterned recording media, comprising
   determining a phase correction value Po including:
      selecting at least one starting delay value;
      writing at least one pattern on the patterned recording media by writing a particular pattern on the patterned recording media using at least two different delay values;
      reading the at least one pattern;
      determining a phase correction value and adjusting the delay of the recording head so that the phase of the recording head is synchronized with the phase of the patterned recording media; and
   periodically measuring and correcting any variations in phase.

24. The method of claim 23, wherein the act of writing at least one pattern on the patterned recording media using the at least two different delay values comprises the act of writing a particular pattern on the patterned recording media with a plurality of delay values that correspond to a plurality of increments of one full clock cycle.

25. The method of claim 23, further comprising the act of determining an initial bit location on the recording media.

26. The method of claim 25, wherein the act of determining an initial bit location comprises:
   writing at least one pattern on the patterned recording media;
   reading the at least one pattern; and
   determining the location of a starting bit based upon the resulting written at least one pattern.

27. The method of claim 26, wherein the act of writing at least one pattern on the patterned recording media comprises writing a particular pattern on the patterned recording media.

28. The method of claim 26, wherein the act of writing at least one pattern on the patterned recording media comprises writing a pattern comprised of a combination of ones and zeros, wherein with each successive written pattern the at least one pattern is sequentially shifted in a particular direction.

29. The method of claim 26, wherein the act of writing at least one pattern on the patterned recording media comprises writing at least one decodable pattern on the patterned recording media.

30. The method of claim 23, wherein the act of periodically measuring and correcting any variations in phase comprises:
   writing data on a portion of the recording media;
   reading the data;
   determining a phase (P) of the read signal; and
   adjusting the delay of a recording head so that (Po−P) is approximately equal to zero.

* * * * *

UNITED STATES PATENT AND TRADEMARK OFFICE
CERTIFICATE OF CORRECTION

PATENT NO. : 6,738,207 B1 Page 1 of 1
APPLICATION NO. : 09/641213
DATED : May 18, 2004
INVENTOR(S) : Belser et al.

It is certified that error appears in the above-identified patent and that said Letters Patent is hereby corrected as shown below:

In Column 13, line 6, please make the following change:

--increments of one full ~~dock~~ clock cycle.--

Signed and Sealed this

First Day of May, 2007

JON W. DUDAS
*Director of the United States Patent and Trademark Office*